US012589484B2

(12) United States Patent
Liu et al.

(10) Patent No.: US 12,589,484 B2
(45) Date of Patent: Mar. 31, 2026

(54) THREE-DEGREE-OF-FREEDOM PARALLEL MECHANISM, PARALLEL ROBOT AND MACHINE TOOL

(71) Applicant: TIANJIN UNIVERSITY, Tianjin (CN)

(72) Inventors: Haitao Liu, Tianjin (CN); Xianlei Shan, Tianjin (CN); Hongye Wu, Tianjin (CN); Jiale Han, Tianjin (CN); Juliang Xiao, Tianjin (CN); Tian Huang, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/760,792

(22) Filed: Jul. 1, 2024

(65) Prior Publication Data

US 2024/0359316 A1      Oct. 31, 2024

(30) Foreign Application Priority Data

Dec. 15, 2023    (CN) .......................... 202311727756.1

(51) Int. Cl.
B25J 9/10 (2006.01)
B25J 9/00 (2006.01)
B25J 9/14 (2006.01)

(52) U.S. Cl.
CPC ........... B25J 9/0036 (2013.01); B25J 9/0009 (2013.01); B25J 9/144 (2013.01)

(58) Field of Classification Search
CPC ...... B25J 9/144; B25J 9/0036; B25J 17/0216; B25J 9/0042; B25J 17/0266
See application file for complete search history.

(56) References Cited

U.S. PATENT DOCUMENTS

| | | | | |
|---|---|---|---|---|
| 5,715,729 A | * | 2/1998 | Toyama | B23Q 1/5462 901/29 |
| 6,431,802 B1 | * | 8/2002 | Wahl | B23Q 1/44 409/211 |
| 6,719,506 B2 | * | 4/2004 | Chang | B25J 9/0042 409/137 |
| 7,337,691 B2 | * | 3/2008 | Roy | B23Q 1/5456 901/29 |
| 7,793,564 B2 | * | 9/2010 | Huang | B25J 17/0266 409/201 |
| 8,225,692 B2 | * | 7/2012 | Kock | B23Q 1/5462 901/19 |

(Continued)

FOREIGN PATENT DOCUMENTS

| | | | | | |
|---|---|---|---|---|---|
| CN | 102059697 A | * | 5/2011 | .......... | B25J 17/0266 |
| FR | 2957001 A1 | * | 9/2011 | .......... | B25J 17/0266 |
| WO | WO-2007144585 A2 | * | 12/2007 | .......... | B25J 17/0216 |

*Primary Examiner* — Randell J Krug

(57) ABSTRACT

Disclosed is a three-degree-of-freedom parallel mechanism, a parallel robot and a machine tool. The parallel mechanism includes a fixed frame and a moving platform, and the fixed frame includes a fixed seat and a cylindrical body fixedly connected to the fixed seat; three identical limbs are uniformly distributed in the cylindrical body in a circumferential direction, and each limb includes a prismatic joint A, a hinge A, a swing arm, a hinge B and a hinge C which are sequentially connected; an axis of the hinge A is perpendicular to an axis of movement of the prismatic joint A; an axis of the hinge B is perpendicular to, but does not intersect with the axis of the hinge A, which rotates around the axis of the hinge A; the hinge C has two rotational degrees of freedom.

20 Claims, 4 Drawing Sheets

(56)         References Cited

U.S. PATENT DOCUMENTS

| | | | |
|---|---|---|---|
| 9,943,967 B2 * | 4/2018 | Huang | B25J 9/0066 |
| 11,813,709 B2 * | 11/2023 | Chen | B23Q 1/5462 |
| 11,813,743 B2 * | 11/2023 | Sun | B25J 9/0072 |
| 2003/0005786 A1 * | 1/2003 | Stuart | B25J 17/0266 |
| | | | 409/235 |
| 2004/0086351 A1 * | 5/2004 | Kim | B25J 7/00 |
| | | | 409/235 |
| 2006/0241810 A1 * | 10/2006 | Zhang | B25J 17/0266 |
| | | | 700/245 |
| 2007/0137476 A1 * | 6/2007 | Neumann | B25J 9/006 |
| | | | 91/506 |
| 2008/0193241 A1 * | 8/2008 | Huang | B25J 17/0266 |
| | | | 409/211 |
| 2010/0122602 A1 * | 5/2010 | Marcroft | B25J 17/0216 |
| | | | 901/18 |
| 2011/0113918 A1 * | 5/2011 | Zhao | B25J 17/0266 |
| | | | 74/490.05 |
| 2012/0272773 A1 * | 11/2012 | Monti | B25J 17/0266 |
| | | | 901/23 |
| 2013/0087004 A1 * | 4/2013 | Neumann | B23Q 1/5462 |
| | | | 901/19 |
| 2017/0113356 A1 * | 4/2017 | Huang | B25J 17/0266 |
| 2018/0333842 A1 * | 11/2018 | McEntee | B25J 9/0066 |

* cited by examiner

THREE-DEGREE-OF-FREEDOM PARALLEL MECHANISM, PARALLEL ROBOT AND MACHINE TOOL

CROSS-REFERENCE TO RELATED APPLICATION

This application claims priority from the Chinese patent application 202311727756.1 filed Dec. 15, 2023, the content of which is incorporated herein in the entirety by reference.

TECHNICAL FIELD

The present invention relates to the field of robots, in particular to a three-degree-of-freedom parallel mechanism, a parallel robot and a machine tool.

BACKGROUND ART

At present, a three-degree-of-freedom parallel mechanism with two rotational degrees of freedom and one translational degree of freedom is a very important class of lower mobility parallel mechanisms. The parallel mechanism has the advantages of large rigidity-mass ratio, high load capacity, compact structure and the like, and may more effectively save system design, manufacturing and control costs in the applications of machining such as metal cutting.

As known from U.S. Pat. No. 6,431,802 (or WO0025976, EP1123175, CA2349579, DE 19850708), the most common spatial one-translational and two-rotational parallel mechanism at present includes a fixed frame, a moving platform and three limbs with the same structure, wherein each limb includes five sections: a driving device, a linear guide rail, a carriage, a hinge and a connecting rod. The structure of the parallel mechanism is axisymmetric in space, an end effector is fixedly connected with the moving platform, the direction of the guide rail is parallel to axes of symmetry, the carriage is connected with the linear guide rail through a prismatic joint A, one end of the connecting rod is connected with the moving platform through a hinge with three rotational degrees of freedom, the other end of the connecting rod is connected with the carriage through the hinge with one rotational degree of freedom, the driving device and the linear guide rail are fixedly arranged on the fixed frame, and the carriage is driven by a combined structure of a servo motor and a ball screw pair or other linear driving devices. In the parallel mechanism with the above structure, each carriage may independently move along the linear guide rail under the drive of the combined structure of the servo motor and the ball screw pair, so that the moving platform moves along one axis of symmetry and rotates around two orthogonal axes perpendicular to the axis relative to the fixed frame.

In the above mechanism, a joint part of the hinge with three rotational degrees of freedom and the connecting rod is of a cantilever structure, and bearings used at all joint parts are small in dimension, fewer in type, poor in force transmission effect and unlikely to ensure the overall rigidity; and three rotational axes of the hinge are required to intersect at one point, resulting in high manufacturing and assembly difficulties, and difficulty in ensuring the precision.

SUMMARY

The present invention aims to overcome defects in the prior art to provide a three-degree-of-freedom parallel mechanism, a parallel robot and a machine tool, which may effectively transmit driving force, are easy to manufacture and assemble and have high overall rigidity.

The present invention provides the following technical solutions for solving the technical problems in the prior art:

A three-degree-of-freedom parallel mechanism includes a fixed frame and a moving platform, and the fixed frame includes a fixed seat and a cylindrical body fixedly connected to the fixed seat; three identical limbs are uniformly distributed in the cylindrical body in a circumferential direction, and each limb includes a prismatic joint A, a hinge A, a swing arm, a hinge B and a hinge C which are sequentially connected; an axis of the hinge A is perpendicular to an axis of movement of the prismatic joint A; an axis of the hinge B is perpendicular to, but does not intersect with the axis of the hinge A, which rotates around the axis of the hinge A; the hinge C has two rotational degrees of freedom; the hinge C includes two pivots that intersect with each other at a right angle, namely a pivot d and a pivot c, wherein the pivot d rotates around an axis of the pivot c, the axis of the pivot c intersects with the axis of the hinge B at a right angle, and the pivot c rotates around the axis of the hinge B; and the pivot d of each limb is rotationally connected with the moving platform.

Further, the hinge B includes a hinge mount b and a pivot b which are configured to rotate relative to each other, and the pivot b and the pivot c are connected into a cross shaft.

Further, a joint part of the pivot b and the pivot c is a cylinder; an axis of the cylinder coincides with an axis of the pivot b; and a height of the cylinder is larger than a diameter of the pivot c, and a diameter of the cylinder is 1.5-3 times as large as that of the pivot b.

Further, a middle section of the pivot d is a rectangle, and a shaft hole through which the pivot c penetrates is formed in a center of the pivot d.

Further, the prismatic joint A includes a connecting plate fixedly connected with the cylindrical body, a linear guide rail is fixed on the connecting plate, and a saddle is in sliding fit on the linear guide rail; and the hinge A includes a hinge mount a and a pivot a which rotate relative to each other, one of the hinge mount a and the pivot a is fixedly connected with the saddle, and the other one is connected with the swing arm.

Further, the hinge mount of the hinge A and the hinge mount of the hinge B are integrally connected with the swing arm.

Further, a longitudinal section of the swing arm is a rectangle with a triangular or arc-shaped notch on one side, and the notch faces towards an axis of the cylindrical body.

Further, the prismatic joint A includes the connecting plate fixedly connected with the cylindrical body, wherein the linear guide rail is fixed on the connecting plate, the saddle is in sliding fit on the linear guide rail, and a sliding table is fixedly connected to the saddle; the prismatic joint A in each limb is driven by a driving device to move back and forth along the axis of movement; the driving device includes one of the following linear driving structures: a combined structure of a servo motor and a ball screw pair, and a hydraulic linear driving structure; in the combined structure of the servo motor and the ball screw pair, an output shaft of the servo motor is connected with a screw rod of the ball screw pair, and a nut of the ball screw pair is fixedly connected with the sliding table; and the hydraulic linear driving structure includes a hydraulic cylinder, and a piston rod of the hydraulic cylinder is fixedly connected with the sliding table.

The present invention further provides a parallel robot, including the three-degree-of-freedom parallel mechanism.

The present invention further provides a machine tool, including the three-degree-of-freedom parallel mechanism.

The present invention has the advantages and positive effects that: according to the three-degree-of-freedom parallel mechanism, the three identical limbs are uniformly distributed in the cylindrical body in the circumferential direction, so that manufacturing and assembly difficulties are easy, and the precision is easy to guarantee; and each limb includes the prismatic joint A, the hinge A, the swing arm, the hinge B and the hinge C which are sequentially connected, and the hinge C has the two rotational degrees of freedom. The combination of a single-degree-of-freedom hinge and a two-degree-of-freedom hinge allows for higher efficiency in motion and force transmission, compared to a three-degree-of-freedom hinge that connects each limb with the moving platform, with three rotational axes intersecting to each other at right angles.

The three-degree-of-freedom parallel mechanism is connected with the swing arm without a cantilever structure, and the shaft hole through which the pivot c penetrates is formed in the pivot d; and bearings with larger dimensions and a wider variety may be placed in the shaft hole. The present invention is beneficial to improving the overall rigidity of the mechanism.

The three-degree-of-freedom parallel mechanism of the present invention may be applied to related fields such as robots and machine tools.

In the figures: 1. Hinge C; 2. Hinge mount b; 3. Hinge mount a; 4. Saddle; 5. Linear guide rail; 6. Ball screw pair; 7. Connecting plate; 8. Servo motor; 9. Cross shaft; 10. Pivot a; 11. Fixed seat; 12. Cylindrical body; 13. Moving platform; 14. Swing arm.

DETAILED DESCRIPTION OF THE EMBODIMENTS

Figure 1:
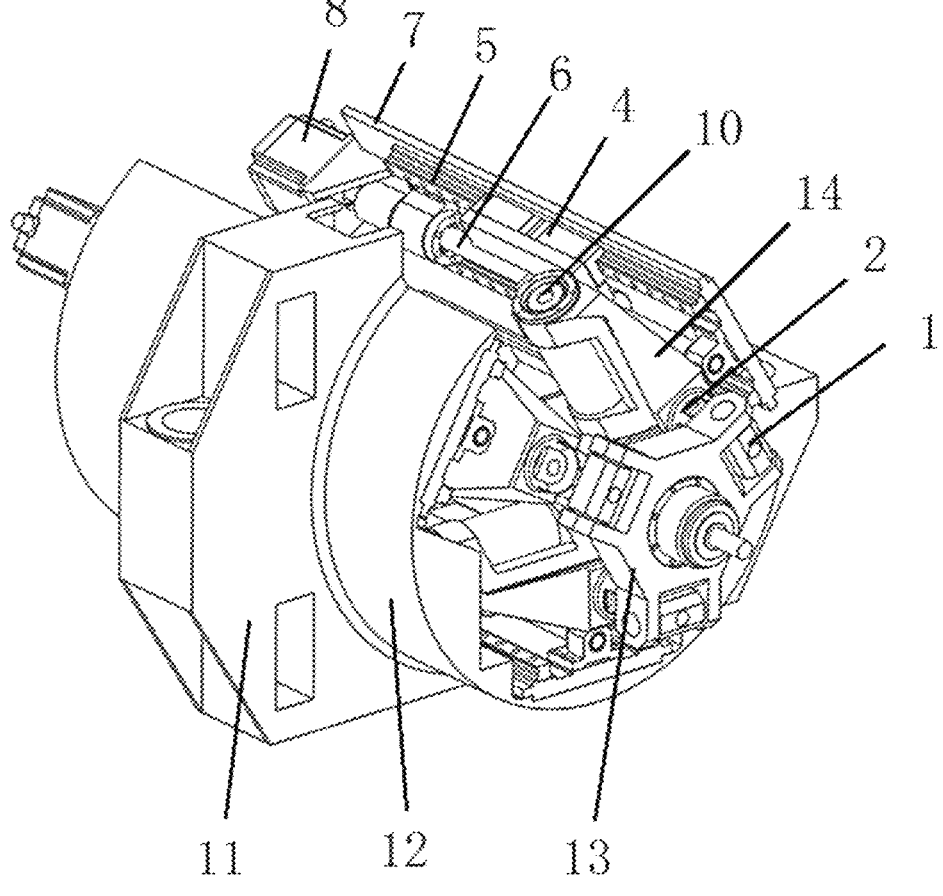
FIG. 1 is a schematic view of a three-degree-of-freedom parallel mechanism in a partially cut-away perspective according to the present invention.
Figure 2:
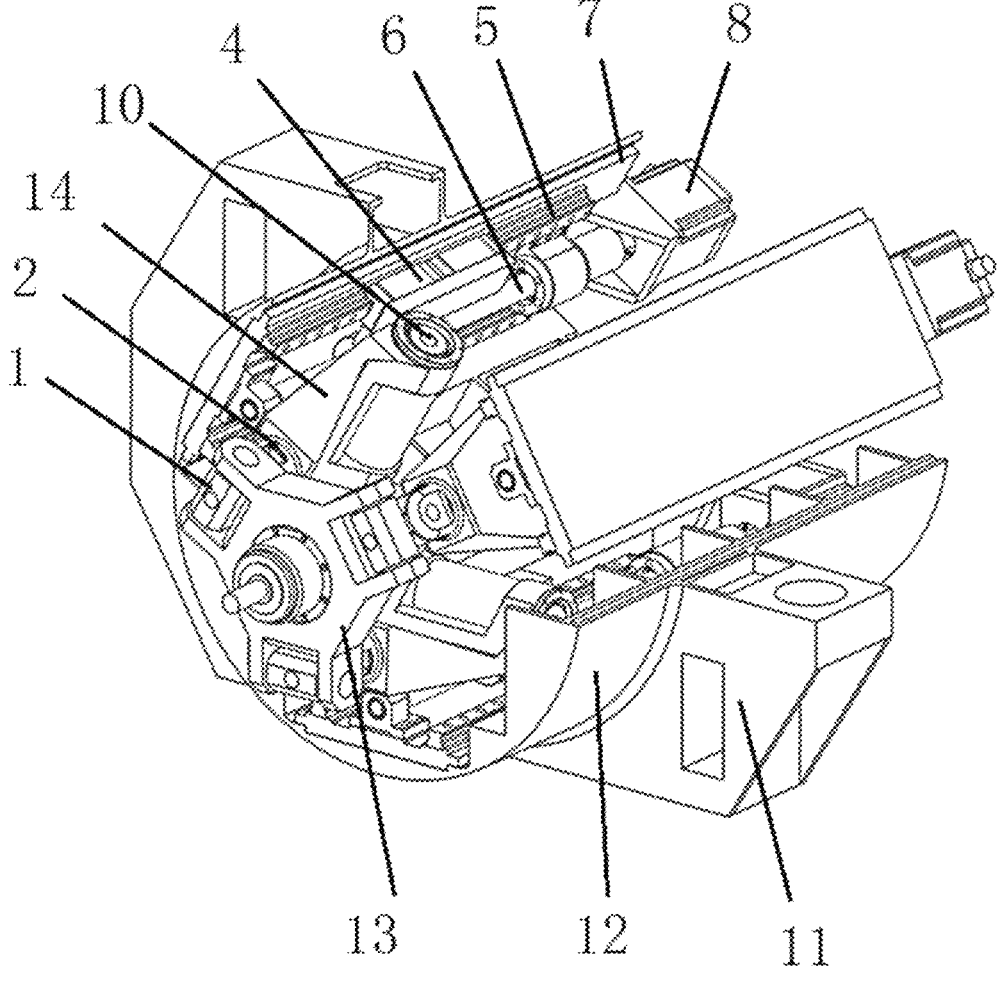
FIG. 2 is a schematic perspective view of FIG. 1 after rotation.
Figure 3:
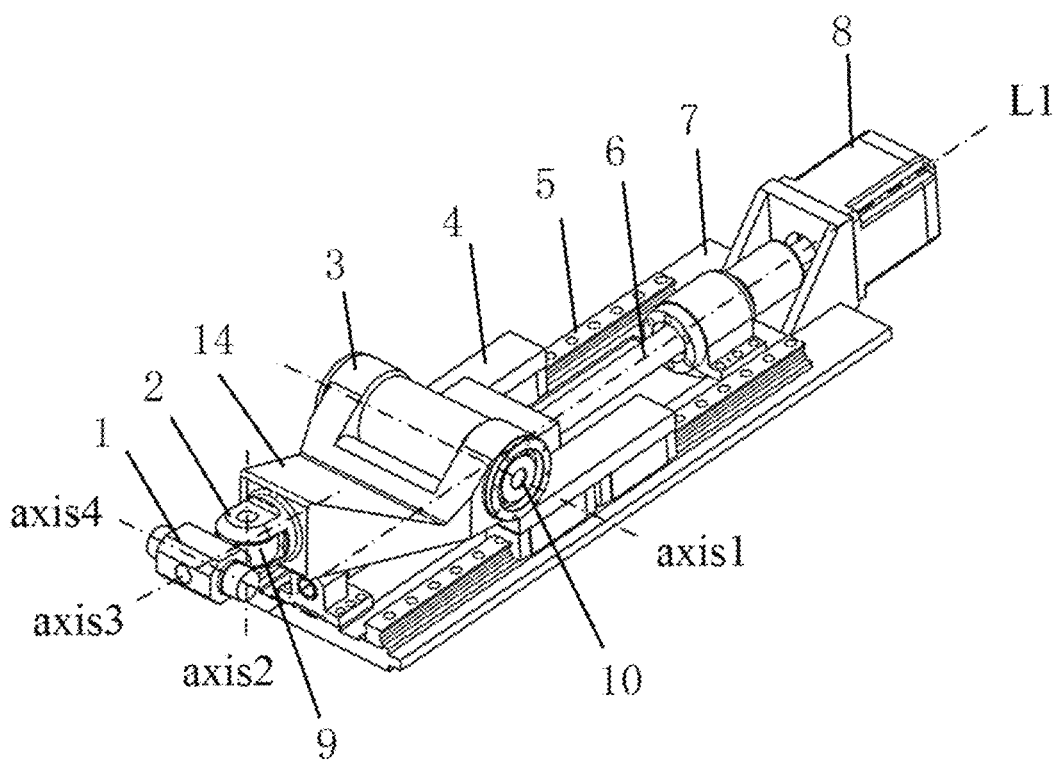
FIG. 3 is a schematic perspective view of a limb according to the present invention.
Figure 4:
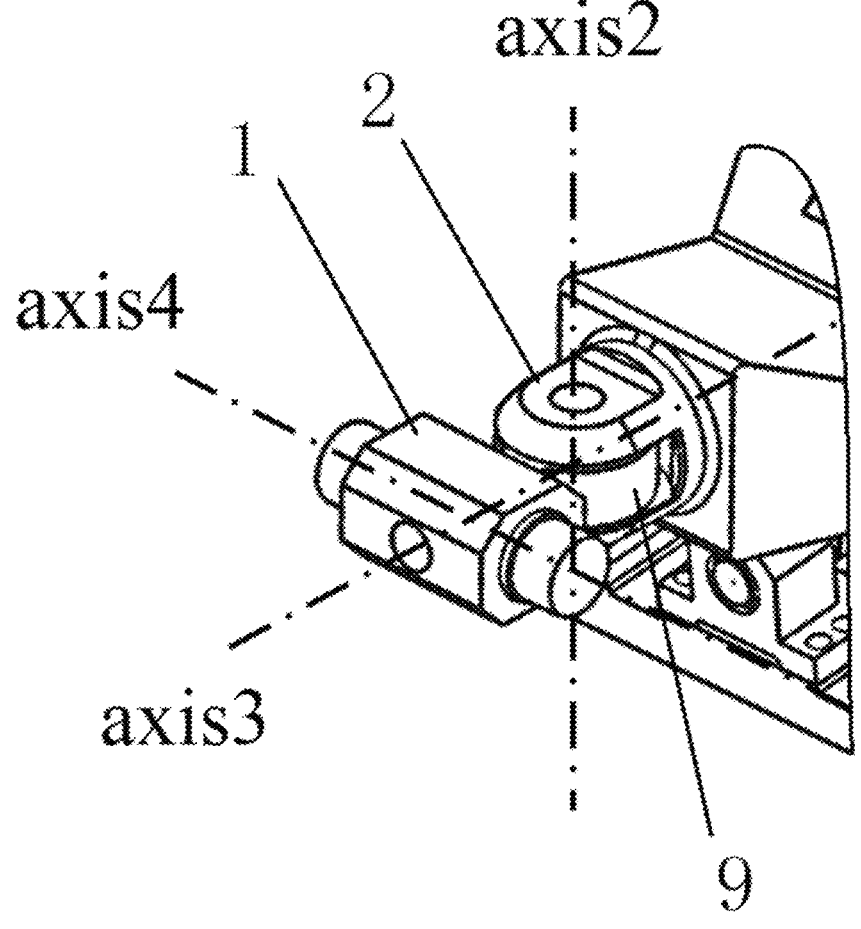
FIG. 4 is a schematic structural diagram illustrating a connection between a hinge B and a hinge C in a three-dimensional structure of a branched chain according to the present invention.

In order to further understand the contents, features and effects of the present invention, the following embodiments are listed and described in detail below with reference to the accompanying drawings:

Referring to FIGS. 1 to 4, a three-degree-of-freedom parallel mechanism includes a fixed frame and a moving platform 13, wherein the fixed frame includes a fixed seat 11 and a cylindrical body 12 fixedly connected to the fixed seat 11; three identical limbs are uniformly distributed in the cylindrical body 12 in a circumferential direction, and each limb includes a prismatic joint A, a hinge A, a swing arm 14, a hinge B and a hinge C1 which are sequentially connected; an axis of the hinge A is perpendicular to an axis of movement of the prismatic joint A; an axis of the hinge B is perpendicular to, but does not intersect with the axis of hinge A, which rotates around the axis of hinge A; the hinge C1 has two rotational degrees of freedom; the hinge C1 includes two pivots that intersect with each other at a right angle, namely a pivot d and a pivot c, wherein the pivot d rotates around an axis of the pivot c, the axis of the pivot c intersects with the axis of the hinge B at a right angle, and the pivot c rotates around the axis of the hinge B; and the pivot d of each limb is rotationally connected with the movable platform 13.

Preferably, the hinge B may include a hinge mount b2 and a pivot b which are configured to rotate relative to each other, and the pivot b and the pivot c may be connected into a cross shaft 9. The pivot b and the pivot c are connected into the cross shaft 9, so that intermediate transmission links are reduced, and the transmission efficiency and the transmission precision are improved.

Preferably, a joint part of the pivot b and the pivot c may be a cylinder, that is, the pivot b and the pivot c are both connected with the cylinder; an axis of the cylinder may be coincides with an axis of the pivot b; and a height of the cylinder may be larger than a diameter of the pivot c, and a diameter of the cylinder may be 1.5-3 times as large as that of the pivot b. Preferably, the diameter of the cylinder is 2.5 times as large as that of the pivot b. The joint part of the pivot b and the pivot c is the cylinder, which may enhance the rigidity at the junction of the two pivots and reduce stress concentration.

The joint part of the pivot b and the pivot c may also be a cuboid, that is, the pivot b and the pivot c are both connected with the cuboid; and the minimum side length of one surface of the cuboid that is connected with the pivot b is 1.5-3 times, preferably 2.5 times, as large as the diameter of the pivot b. The minimum side length of one surface of the cuboid that is connected with the pivot c is 1.5-3 times, preferably 2.5 times, as large as the diameter of the pivot c. Each side of the cuboid is chamfered at 45°, with a chamfering length being 1/10 to 1/5 less than the minimum side length of the corresponding surface. The joint part of the pivot b and the pivot c is the cuboid, which enhances the rigidity at the junction of the two pivots and reduces stress concentration. Each side of the cuboid is chamfered at 450 to further enhance the rigidity and reduce the stress concentration.

Preferably, a middle section of the pivot d may be a rectangle, and a shaft hole through which the pivot c penetrates is formed in a center of the pivot d. Four sides of the rectangle may be chamfered at 45°, with a chamfering length being 1/10 to 1/5 less than the minimum side length of the rectangle. The middle section of the pivot d is the rectangle, which may enhance the rigidity of the pivot d, and the four edges of the rectangle are chamfered at 450 to further enhance the rigidity of the pivot d and reduce the stress concentration.

Preferably, the prismatic joint A may include a connecting plate 7 fixedly connected with the cylindrical body 12, a linear guide rail 5 is fixed on the connecting plate 7, and a saddle 4 is in sliding fit on the linear guide rail 5; and the hinge A includes a hinge mount a3 and a pivot a10 which rotate relative to each other, one of the hinge mount a3 and the pivot a10 may be fixedly connected with the saddle 4, the other one may be connected with the swing arm 14, and the saddle 4 is driven by a driving device to move back and forth along the axis of movement of the prismatic joint A. In this way, the whole hinge A may move back and forth along the axis of movement of the prismatic joint A under the drive of the driving device. One of the hinge mount a3 and the pivot a10 may be fixedly connected with the saddle 4, for example, if the hinge mount a3 is fixedly connected with the saddle 4, the pivot a10 rotates, and if the pivot a10 is fixedly connected with the saddle 4, the hinge mount a3 rotates.

The prismatic joint A may also be implemented using other connecting structures, such as a linear motor. In this case, the linear motor may be directly fixed on an inner wall of the cylindrical body 12, and a component, fixed relative to the prismatic joint A, of the hinge A is connected to a rotor of the linear motor.

Preferably, the hinge mount of the hinge A and the hinge mount of the hinge B may be integrally connected with the swing arm 14. That is, the hinge mount a3, the swing arm 14 and the hinge mount b2 are connected into a whole. The hinge mount a3 of the hinge A and the hinge mount b2 of the hinge B may be made into a whole with the swing arm 14, which reduces assembly errors and enhances overall rigidity.

Preferably, a longitudinal section of the swing arm 14 may be a rectangle with a triangular or arc-shaped notch on one side, and the notch faces towards an axis of the cylindrical body 12. The longitudinal section of the swing arm 14 refers to a section of the swing arm 14 cut away along the axis of the pivot b. The rectangle with the triangular or arc-shaped notch on one side is selected as the longitudinal section of the swing arm 14, which reduces the mass of the swing arm 14 while maintaining its rigidity, and it facilitates the manufacturing of the hinge mount of hinge A and the hinge mount of the hinge B as an integral unit.

Preferably, an outer contour of a cross section of the cylindrical body 12 may be a circle or a regular hexagon. The circle or the regular hexagon is selected as the outer contour of the cross section of the cylindrical body 12, which enhances the rigidity of the three-degree-of-freedom parallel mechanism, and facilitates assembly.

Preferably, the prismatic joint A may include the connecting plate 7 fixedly connected with the cylindrical body 12, wherein the linear guide rail 5 may be fixed on the connecting plate 7, the saddle 4 may be in sliding fit on the linear guide rail 5, and a sliding table may be fixedly connected to the saddle 4; the prismatic joint A in each limb is driven by the driving device to move back and forth along the axis of movement; the driving device may include one of the following linear driving structures: a combined structure of a servo motor 8 and a ball screw pair 6, and a hydraulic linear driving structure; in the combined structure of the servo motor 8 and the ball screw pair 6, an output shaft of the servo motor 8 is connected with a screw rod of the ball screw pair 6, and a nut of the ball screw pair 6 is fixedly connected with the sliding table; and the hydraulic linear driving structure includes a hydraulic cylinder, and a piston rod of the hydraulic cylinder is fixedly connected with the sliding table.

The combined structure of the servo motor 8 and the ball screw pair 6 has high transmission precision; and the hydraulic linear driving structure has fewer transmission links, and precise hydraulic elements such as a servo valve may be used to achieve high-precision and heavy-load linear drive.

Preferably, the movable platform 13 may be a regular hexagonal prism, and hinge mounts of the hinges C1 may be arranged on three sides of the moving platform 13.

The moving platform 13 is of the regular hexagonal prism, so that the hinge mounts of the hinges C1 are conveniently arranged on the sides; and center points of shaft holes of the hinge mounts of the hinges C1 are sequentially connected into a hexagon, and the side length ratio of two adjacent sides of the hexagon is 1.2-1.5:1 according to technical requirements for transmission loads and the like. The proportion parameter may be optimized according to performance requirements and actual working conditions for the moving platform, after which the proportion parameter is adjusted according to the optimized result.

The present invention further provides an embodiment of a parallel robot, including the three-degree-of-freedom parallel mechanism. The parallel robot may be formed by installing a main shaft structure on an axis of a moving platform 13.

The present invention further provides an embodiment of a machine tool, including the three-degree-of-freedom parallel mechanism. The machine tool is constituted by a main shaft structure installed on an axis of a moving platform 13, together with other components for the machine tool, which allows for machining, including precision components.

The structure and operating principle of the present invention will be further described with reference to a preferred embodiment of the present invention:

A three-degree-of-freedom parallel mechanism can achieve one translation and two rotations and includes a fixed frame and a moving platform 13, wherein the fixed frame includes a fixed seat 11 and a cylindrical body 12 fixedly connected to the fixed seat 11; and three limbs with identical structures, i.e., a first limb, a second limb and a third limb, are uniformly distributed in the cylindrical body 12 in a circumferential direction, and the first limb, the second limb and the third limb are uniformly distributed around an axis of the cylindrical body 12.

Each limb includes a prismatic joint A, a hinge A, a swing arm 14, a hinge B and a hinge C1 which are connected sequentially; an axis of the hinge A is perpendicular to an axis of movement of the prismatic joint A; an axis of hinge B is perpendicular to, but does not intersect with the axis of hinge A, which rotates around the axis of hinge A; the hinge C1 has two rotational degrees of freedom; the hinge C1 includes two pivots that intersect with each other at a right angle, namely a pivot d and a pivot c, wherein the pivot d rotates around an axis of the pivot c, the axis of the pivot c intersects with the axis of the hinge B at a right angle, and the pivot c rotates around the axis of the hinge B; and the pivot d of each limb is rotationally connected with the moving platform 13. The prismatic joint A in each limb is driven by a driving device to move back and forth along the axis of movement.

In each limb, the prismatic joint A includes a connecting plate 7 fixedly connected with the cylindrical body 12, a linear guide rail 5 is fixed on the connecting plate 7, and a saddle 4 is in sliding fit on the linear guide rail 5; and the hinge A includes a hinge mount a3 and a pivot a10 which rotate relative to each other, the pivot a10 is fixedly connected with the saddle 4, and the pivot a3 is connected with the swing arm 14.

The hinge B includes a hinge mount b2 and a pivot b which are configured to rotate relative to each other, and the pivot b and the pivot c are connected into a cross shaft 9.

A joint part of the pivot b and the pivot c, namely a junction of the cross shaft, is a cylinder; an axis of the cylinder coincides with an axis of the pivot b; and a height of the cylinder is larger than a diameter of the pivot c, and a diameter of the cylinder is 2.5 times as large as that of the pivot b.

A middle section of the pivot d is a square, and a shaft hole through which the pivot c penetrates is formed in a center of the pivot d. The side length of the square is 2.5 times as large as the diameter of the pivot c.

The hinge mount a3 of the hinge A and the hinge mount b2 of the hinge B are integrally connected with the swing arm 14. A longitudinal section of the swing arm 14 is a rectangle with a triangular or arc-shaped notch on one side, and the notch faces towards the axis of the cylindrical body 12.

An outer contour of a cross section of the cylindrical body 12 is a circle.

The moving platform 13 is a regular hexagonal prism, and hinge mounts of the hinges C1 are arranged on three sides of the moving platform 13.

The driving device includes a combined structure of a servo motor 8 and a ball screw pair 6; in the combined structure of the servo motor 8 and the ball screw pair 6, an output shaft of the servo motor 8 is connected with a screw rod of the ball screw pair 6, and a nut of the ball screw pair 6 is fixedly connected with the saddle 4; and two ends of the screw rod are rotationally connected with bearing pedestals, and the bearing pedestals at the two ends of the screw rod are fixedly connected with the connecting plate 7. A middle section of the screw rod is matched with the nut of the ball screw pair 6, and the nut of the ball screw pair 6 is fixedly connected with the saddle, so that the saddle is driven to move.

The operating principle of the present invention is as follows:

Each of the hinge A and the hinge B has one rotational degree of freedom; the axis of movement of the prismatic joint A is referred to as L1, and the axis of the hinge A is referred to as axis1; the axis of hinge B is referred to as axis2; the axis of the pivot c of the hinge C1 is referred to as axis3, and the axis of the pivot d of the hinge C1 is referred to as axis4; the axis (axis3) intersects with the axis (axis4) at a right angle; the axis (axis2) intersects with the axis (axis3) at a right angle; the axis (axis2) and the axis (axis4) do not intersect nor are they perpendicular to each other; and the axis (axis1) is perpendicular to, but does not intersect with the axis (axis2).

The present invention differs from the parallel mechanism as disclosed in U.S. Pat. No. 6,431,802 in that: the hinges, connected with the moving platform 13, of the limbs are split into a single-degree-of-freedom hinge B and a two-degree-of-freedom hinge C1, and the hinge C1 has two rotational degrees of freedom; the hinge C1 includes two pivots that intersect with each other at a right angle, namely a pivot d and a pivot c, the pivot d rotates around the pivot c, and the axis (axis3) intersects with the axis (axis4) at a right angle. Each of the hinge A and the hinge B has one rotational degree of freedom; the axis of rotation (axis2) of the hinge B intersects with the axis (axis3) at a right angle, and the axis (axis2) and the axis (axis4) do not intersect nor are they perpendicular to each other; and the axis of rotation (axis1) of the hinge A is perpendicular to, but does not intersect with the axis of rotation (axis2) of the hinge B. In this way, the force transmission efficiency is higher, the manufacturing and assembly difficulties are easy, the precision is easy to guarantee, and the dimension of a bearing sleeving the pivot c of the hinge C1 may be larger, allowing for a wider variety, thereby enhancing the rigidity of the whole mechanism.

The terms "connection" and "link" used in the present invention should be understood in a broad sense, for example, "connection" may be fixed connection or detachable connection; and it may be direct connection or indirect connection through an intermediate component. For those ordinarily skilled in the art, the specific meaning of the above terms can be understood according to specific circumstances.

The above described embodiments are merely descriptive of the technical thoughts and characteristics of the present invention, and are intended to enable those skilled in the art to understand the contents of the present invention and implement it accordingly, which should not be construed as limiting the patent scope of the present invention; and equivalent variations or modifications made within the spirit disclosed by the present invention still fall within the patent scope of the present invention.

What is claimed:

1. A three degree of freedom (DOF) parallel mechanism, comprising:

a fixed frame and a moving platform, wherein the fixed frame comprises a fixed seat and a cylindrical body fixedly connected to the fixed seat;

three identical limbs uniformly distributed in the cylindrical body in a circumferential direction, wherein each limb comprises a prismatic joint, a first hinge, a swing arm, a second hinge, and a third hinge which are sequentially connected;

wherein an axis of the first hinge is perpendicular to an axis of movement of the first prismatic joint;

an axis of the second hinge is perpendicular to, but does not intersect with the axis of the first hinge, which rotates around the axis of the first hinge;

the third hinge has two rotational degrees of freedom;

the third hinge comprises a first pivot and a second pivot that intersect at a right angle, wherein the second pivot rotates around an axis of the first pivot, the axis of the first pivot intersects with the axis of the second hinge at a right angle, and the second pivot rotates around the axis of the second hinge; and the second pivot of each limb is rotationally connected with the moving platform.

2. The three degree of freedom parallel mechanism according to claim 1, wherein a middle section of the second pivot is a rectangle, and a shaft hole through which the first pivot penetrates is formed in a center of the second pivot.

3. The three degree of freedom parallel mechanism according to claim 1, wherein a longitudinal section of the swing arm is a rectangle with a triangular or arc-shaped notch on one side, and the notch faces towards an axis of the cylindrical body.

4. The three degree of freedom parallel mechanism according to claim 1, wherein the prismatic joint comprises:

a connecting plate fixedly connected with the cylindrical body;

a linear guide rail fixed on the connecting plate;

a saddle in sliding fit on the linear guide rail; and a sliding table fixedly connected to the saddle;

wherein a driving device drives the prismatic joint in each limb back and forth along the axis of movement;

wherein the driving devices comprise one of the following linear driving structures:

a combined structure of a servo motor and a ball screw pair in which an output shaft of the servo motor is connected with a screw rod of the ball screw pair, and a nut of the ball screw pair is fixedly connected with the sliding table; and a hydraulic linear driving structure which comprises a hydraulic cylinder, and a piston rod of the hydraulic cylinder is fixedly connected with the sliding table.

5. The three degree of freedom parallel mechanism according to claim 1, wherein the second hinge comprises a first hinge mount and a third pivot which are configured to rotate relative to each other, and the third pivot and the first pivot are connected into a cross shaft.

6. The three degree of freedom parallel mechanism according to claim 5, wherein a joint part of the third pivot and the first pivot is a cylinder;

an axis of the cylinder coincides with an axis of the third pivot;

a height of the cylinder is larger than a diameter of the first pivot; and a diameter of the cylinder is 1.5 to 3 times as large as that of the third pivot.

7. The three degree of freedom parallel mechanism according to claim 1, wherein the prismatic joint comprises:

a connecting plate fixedly connected with the cylindrical body;

a linear guide rail fixed on the connecting plate; and a saddle in sliding fit on the linear guide rail;

wherein the first hinge comprises a second hinge mount and a fourth pivot which rotate relative to each other;

wherein one of the second hinge mount and the fourth pivot is fixedly connected with the saddle, and the other of the second hinge mount and the fourth pivot is connected with the swing arm.

8. The three degree of freedom parallel mechanism according to claim 7, wherein the second hinge mount of the first hinge and the first hinge mount of the second hinge are integrally connected with the swing arm.

9. A machine tool, comprising the three degree of freedom parallel mechanism according to claim 1.

10. The machine tool of claim 9, wherein a middle section of the second pivot is a rectangle, and a shaft hole through which the first pivot penetrates is formed in a center of the second pivot.

11. The machine tool of claim 9, wherein the second hinge comprises a first hinge mount and a third pivot which are configured to rotate relative to each other, and wherein the third pivot and the first pivot are connected into a cross shaft.

12. The machine tool of claim 11, wherein a joint part of the third pivot and the first pivot is a cylinder;

an axis of the cylinder coincides with an axis of the third pivot;

a height of the cylinder is larger than a diameter of the first pivot; and a diameter of the cylinder is 1.5 to 3 times as large as that of the third pivot.

13. A parallel robot, comprising the three degree of freedom parallel mechanism according to claim 1.

14. The parallel robot of claim 13, wherein a middle section of the second pivot is a rectangle, and a shaft hole through which the first pivot penetrates is formed in a center of the second pivot.

15. The parallel robot of claim 13, wherein a longitudinal section of the swing arm is a rectangle with a triangular or arc-shaped notch on one side, and the notch faces towards an axis of the cylindrical body.

16. The parallel robot of claim 13, wherein the prismatic joint comprises:

a connecting plate fixedly connected with the cylindrical body;

a linear guide rail fixed on the connecting plate;

a saddle in sliding fit on the linear guide rail; and a sliding table fixedly connected to the saddle; wherein a driving device drives the prismatic joint in each limb back and forth along the axis of movement;

the driving devices comprise one of the following linear driving structures:

a combined structure of a servo motor and a ball screw pair in which an output shaft of the servo motor is connected with a screw rod of the ball screw pair, and a nut of the ball screw pair is fixedly connected with the sliding table; and a hydraulic linear driving structure which comprises a hydraulic cylinder, and a piston rod of the hydraulic cylinder is fixedly connected with the sliding table.

17. The parallel robot of claim 13, wherein the second hinge comprises a first hinge mount and a third pivot which are configured to rotate relative to each other, and wherein the third pivot and the first pivot are connected into a cross shaft.

18. The parallel robot of claim 17, wherein a joint part of the third pivot and the first pivot is a cylinder;

an axis of the cylinder coincides with an axis of the third pivot;

a height of the cylinder is larger than a diameter of the first pivot; and a diameter of the cylinder is 1.5 to 3 times as large as that of the third pivot.

19. The parallel robot of claim 13, wherein the prismatic joint comprises:

a connecting plate fixedly connected with the cylindrical body;

a linear guide rail fixed on the connecting plate; and a saddle in sliding fit on the linear guide rail; wherein the first hinge comprises a second hinge mount and a fourth pivot which rotate relative to each other; and wherein one of the second hinge mount and the fourth pivot is fixedly connected with the saddle, and the other of the second hinge mount and the fourth pivot is connected with the swing arm.

20. The parallel robot of claim 19, wherein the second hinge mount of the first hinge and the first hinge mount of the second hinge are integrally connected with the swing arm.

* * * * *